United States Patent
Hallum et al.

(10) Patent No.: US 7,166,379 B2
(45) Date of Patent: Jan. 23, 2007

(54) TECHNIQUE TO REGULATE AN EFFICIENCY OF A FUEL CELL SYSTEM

(75) Inventors: Ryan Hallum, Latham, NY (US); Eric Kueckels, Niskayuna, NY (US); Richard J. Graham, Scotia, NY (US); Adam Solodow, Ballston Spa, NY (US); Mark Torpey, Saratoga Springs, NY (US); Arne Ballantine, Round Lake, NY (US); Chris Comi, Scotia, NY (US)

(73) Assignee: Plug Power Inc., Latham, NY (US)

( * ) Notice: Subject to any disclaimer, the term of this patent is extended or adjusted under 35 U.S.C. 154(b) by 432 days.

(21) Appl. No.: 10/703,234

(22) Filed: Nov. 7, 2003

(65) Prior Publication Data

US 2004/0091756 A1    May 13, 2004

Related U.S. Application Data

(62) Division of application No. 09/749,298, filed on Dec. 27, 2000, now Pat. No. 6,650,968.

(51) Int. Cl.
*H01M 8/04*    (2006.01)
*H01M 8/06*    (2006.01)
(52) U.S. Cl. .............................. 429/23; 429/19; 429/20
(58) Field of Classification Search .................. 429/19, 429/20, 22, 23
See application file for complete search history.

(56) References Cited

U.S. PATENT DOCUMENTS

| 4,904,548 | A | * | 2/1990 | Tajima | ..................... 429/22 |
| 5,156,928 | A | * | 10/1992 | Takabayashi | .............. 429/23 |
| 5,290,641 | A | * | 3/1994 | Harashima | .............. 429/20 X |
| 6,322,917 | B1 | * | 11/2001 | Acker | .................... 429/19 X |
| 6,455,181 | B1 | * | 9/2002 | Hallum | .................... 429/22 X |
| 6,815,107 | B1 | * | 11/2004 | Inai et al. | ..................... 429/22 |

FOREIGN PATENT DOCUMENTS

| CA | 2 429 595 | 5/2002 |
| DE | 100 58 083 | 6/2002 |
| JP | 08138709 A | 5/1996 |
| JP | 2000208161 A | 7/2000 |

OTHER PUBLICATIONS

Computer-generated translation of JP 2000-208161 (Aoki), obtained from the Japanese Patent Office website (Jul. 2000).*

* cited by examiner

*Primary Examiner*—Stephen J. Kalafut
(74) *Attorney, Agent, or Firm*—Trop, Pruner & Hu, P.C.

(57) ABSTRACT

A technique that is usable with a fuel cell stack includes providing a fuel flow to the stack, changing the fuel flow and observing a response of at least one cell voltage of the stack to the change in the fuel flow. An efficiency of the stack is regulated based on the observation.

28 Claims, 9 Drawing Sheets

TECHNIQUE TO REGULATE AN EFFICIENCY OF A FUEL CELL SYSTEM

This is a divisional of prior application Ser. No. 09/749,298 filed Dec. 27, 2000, now U.S. Pat. No. 6,650,968.

BACKGROUND

The invention generally relates to a technique to regulate an efficiency of a fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. The membrane is sandwiched between an anode catalyst layer on one side, and a cathode catalyst layer on the other side. This arrangement is commonly referred to as a membrane electrode assembly (MEA). At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

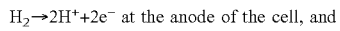

$H_2 \rightarrow 2H^+ + 2e^-$ at the anode of the cell, and

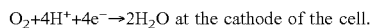

$O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM. The PEM and its adjacent pair are often assembled together in an arrangement sometimes called a membrane electrode unit (MEU).

A fuel cell system may include a fuel processor that converts a hydrocarbon (natural gas, propane methanol, as examples) into the fuel for the fuel cell stack. For a given output power of the fuel cell stack, the fuel and oxidant flow to the stack must satisfy the appropriate stoichiometric ratios governed by the equations listed above. Thus, a controller of the fuel cell system may monitor the output power of the stack and based on the monitored output power, estimate the fuel and air flow to satisfy the appropriate stoichiometric ratios. In this manner, the controller regulates the fuel processor to produce this flow, and in response to the controller detecting a change in the output power, the controller estimates a new rate of fuel and air flow and controls the fuel processor accordingly.

Due to nonideal characteristics of the stack, it may be difficult to precisely predict the rate of fuel and air flow needed for a given output power. Therefore, the controller may build in a sufficient margin of error by causing the fuel processor to provide more fuel and/or air than is necessary to ensure that the cells of the stack receive enough fuel and thus, are not "starved" for fuel or air. However, such a control technique may be quite inefficient, as the fuel cell stack typically does not consume all of the incoming fuel, leaving unconsumed fuel that may burned off by an oxidizer of the fuel cell system.

Thus, there is a continuing need for an arrangement and/or technique to address one or more of the problems that are recited above.

SUMMARY

In an embodiment of the invention, a technique that is usable with a fuel cell stack includes providing a fuel flow to the stack, changing the fuel flow and observing a response of at least one cell voltage of the stack to the change in the fuel flow. An efficiency of the stack is regulated based on the observation.

Advantages and other features of the invention will become apparent from the following description, from the drawing and from the claims.

DETAILED DESCRIPTION

Figure 1:
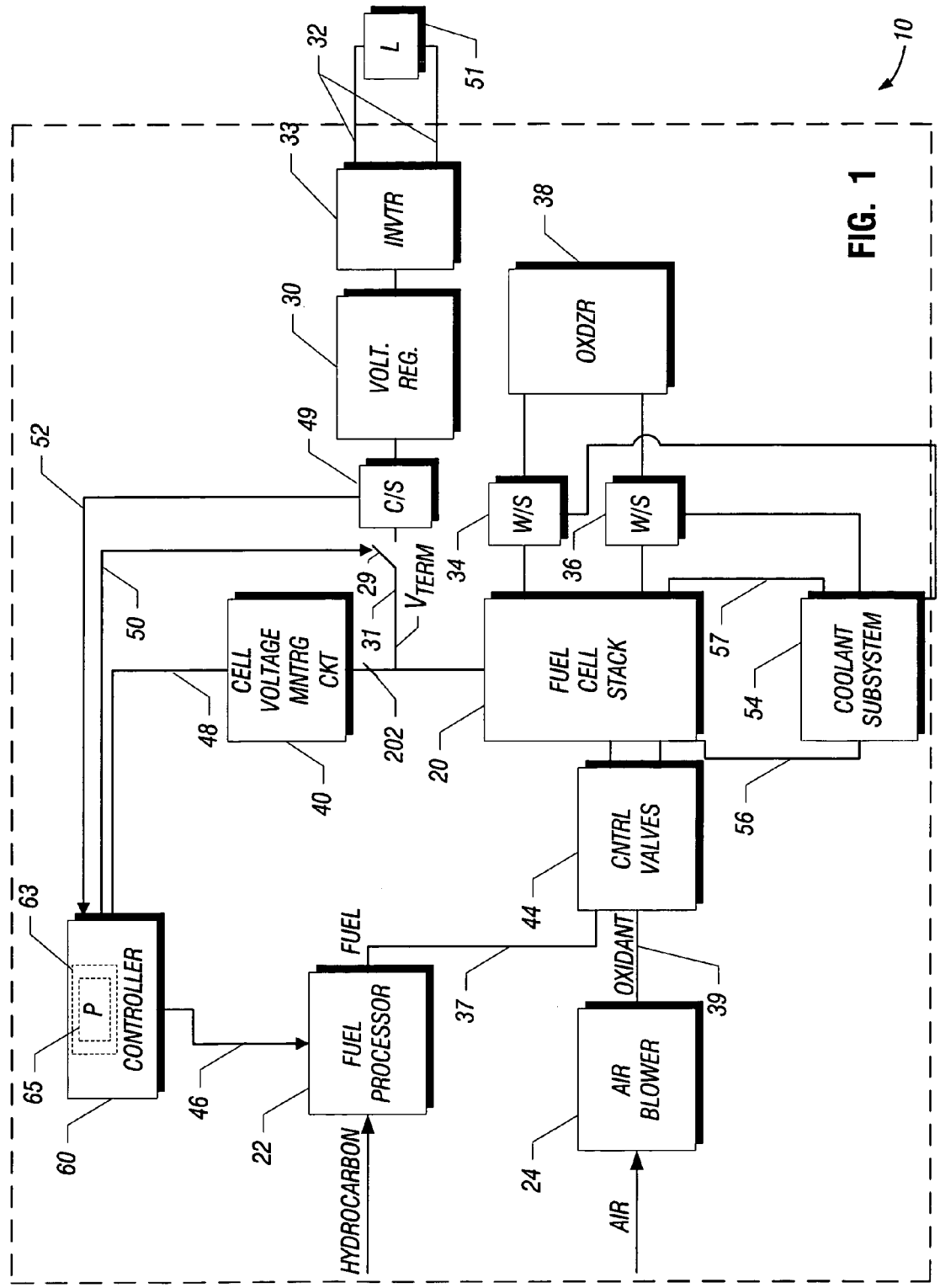
FIG. 1 is a schematic diagram of a fuel cell system according to an embodiment of the invention.

Referring to FIG. 1, an embodiment of a fuel cell system 10 in accordance with the invention includes a fuel cell stack 20 that is capable of producing power for a load 51 (a residential load, for example) in response to fuel and oxidant flows that are provided by a fuel processor 22 and an air blower 24, respectively. In this manner, the fuel cell system 10 controls the fuel production of the fuel processor 22 to control the rate at which fuel is provided to the fuel cell stack 20. As described below, the fuel cell system 10 bases (at least in part) its regulation of the fuel processor 22 on measured cell voltages of the fuel cell stack 20, as the system 10 uses one or more of these measured cell voltages as an indicator of how efficiently the fuel cell system 10 is running.

Figure 2:
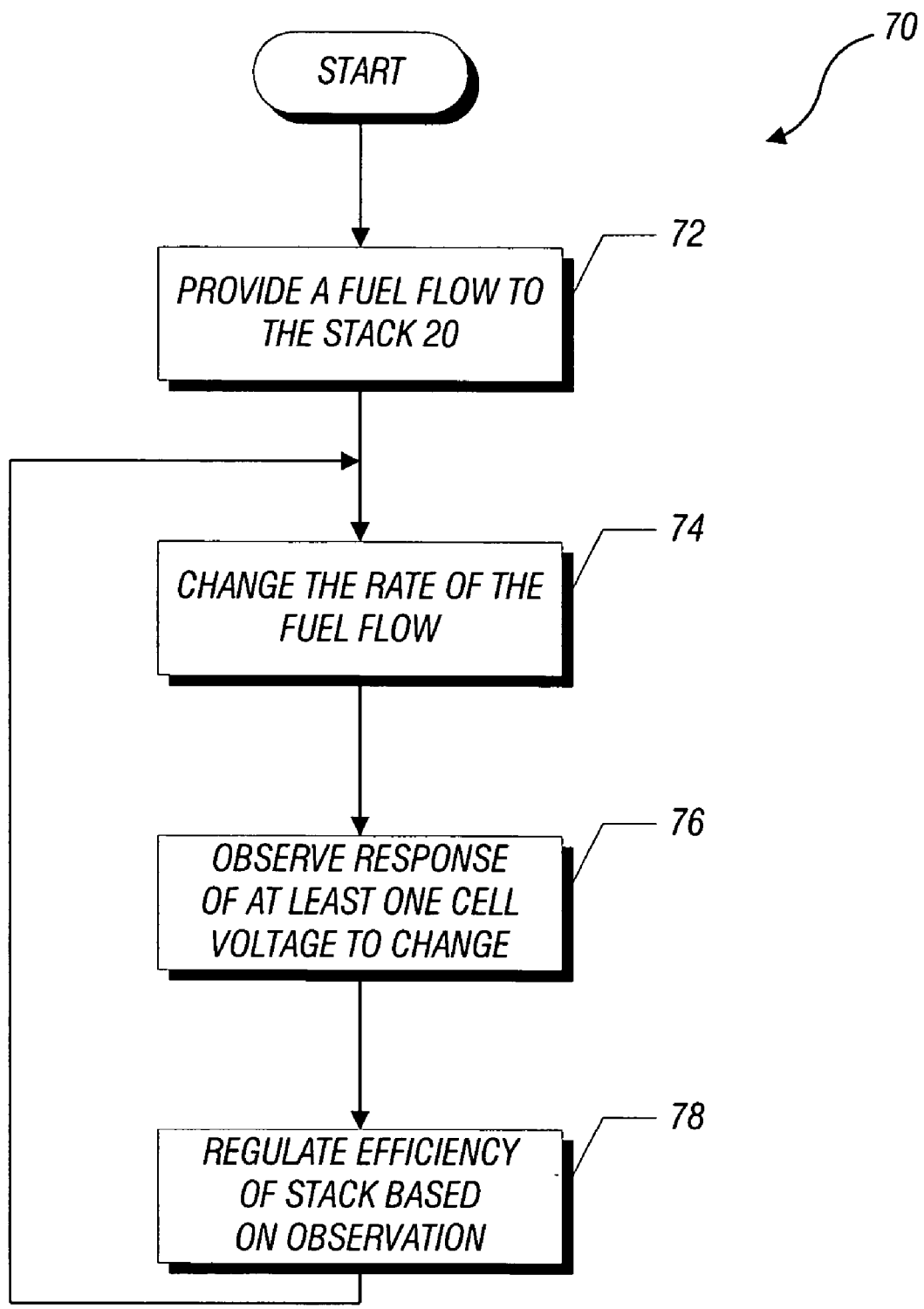
FIGS. 2, 3, 4, 5, 6 and 8 are flow diagrams depicting techniques to regulate an efficiency of the fuel cell system according to embodiments of the invention.

Referring also to FIG. 2, more specifically, in some embodiments of the invention, the system 10 uses a technique 70 to control the efficiency of the fuel cell stack 20 with respect to the fuel flow. In the technique 70, a fuel flow is provided (block 72) to the fuel cell stack 20 and the rate of the flow is changed (block 74). The response of at least one cell voltage to this change is observed (block 76), and the efficiency of the fuel cell stack 20 is regulated (block 78) based on this observation. Because the output power of the fuel cell stack 20 may change over time and because the behavior of the stack 20 itself may change over time, the technique 70 may include returning to block 74 for purposes of continually performing blocks 74, 76 and 78 in a loop.

In some embodiments of the invention, the fuel cell system 10 includes a cell voltage monitoring circuit 40 (see FIG. 1) to measure the cell voltages and communicate (via a serial bus 48, for example) indications of the measured cell voltages to a controller 60 of the system 10. The controller 60 executes a program 65 (stored in a memory 63 of the controller 60) to use the measured voltages to control the fuel processor 22 to perform the technique 70. In this manner, the execution of the program 65 may, in some embodiments of the invention, cause the controller 60 to perform a routine 100 that is depicted in FIG. 3.

Figure 3:
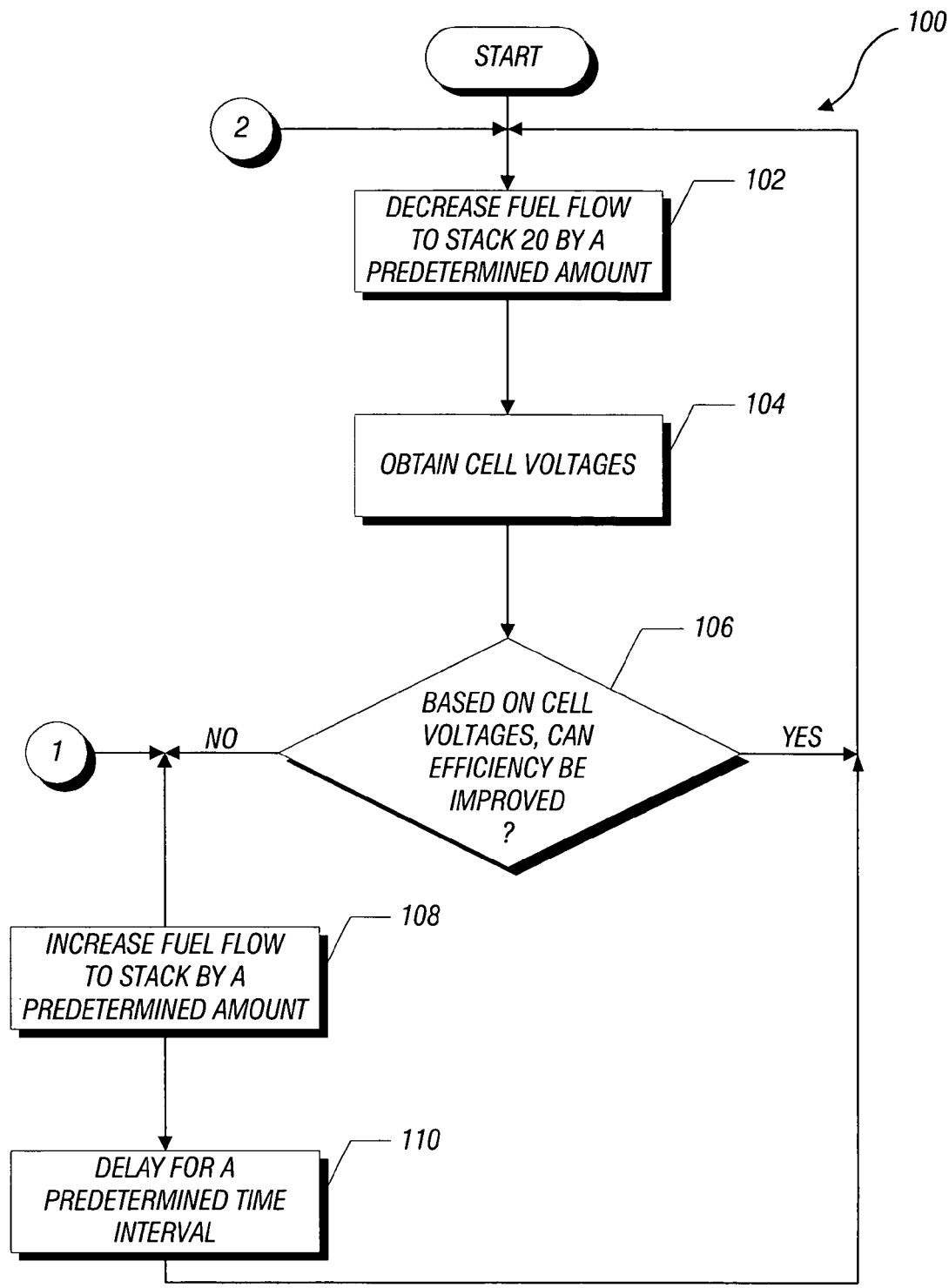

Referring to FIGS. 1 and 3, the routine 100 may be initiated, for example, after the fuel cell system 10 has powered up from a shut down state. In the routine 100, the controller 60 pinpoints the rate of fuel flow that, for the given output power of the fuel cell stack 20, satisfies the appropriate stoichiometric ratios and does not produce a significant amount of unconsumed fuel. Therefore, the routine 100 maximizes the efficiency of the fuel cell stack 20 with respect to the fuel flow.

In the routine 100, the controller 60 regulates the fuel processor 22 to decrease the fuel flow to the stack 20 by a predetermined amount, as depicted in block 102 of FIG. 3. This predetermined amount may be a fixed amount or may be a predetermined percentage of the current flow rate, as just a few examples. Next, the controller 60 obtains (block 104) indications of the cells voltages. As an example, in some embodiments of the invention, the cell voltage monitoring circuit 40 may provide indications of the most recently measured cell voltages to the controller 60 via the serial bus 48. Depending on the particular embodiment of the invention, the cell voltage monitoring circuit 40 may provide the indications of the voltages when requested by the controller 60 or may periodically provide the indications, as just a few examples.

After the controller 60 receives the indications of the cell voltages, the controller 60 determines (diamond 106) from the cell voltages whether the efficiency of the fuel cell stack 20 with respect to the fuel flow can be improved. In this manner, in some embodiments of the invention, if the cell voltages indicate that, after the decrease in fuel flow, the fuel cell stack 20 is receiving a sufficient amount of fuel, control returns to block 102 to decrease the flow again. Otherwise, the controller 60 has pinpointed a fuel flow to maximize efficiency and regulates the fuel processor 22 to increase (block 108) the fuel flow by a predetermined amount to return the rate of fuel flow back to the level that existed before the last decrease. For example, if the controller 60 decreases the fuel flow by 5.00 percent and subsequently determines the efficiency cannot be improved in response to observing the cell voltages' response, the controller 60 increases the fuel flow by 5.26 percent to return the fuel flow to the level before the decrease. Other rates of increase and/or decrease may be used.

After increasing the fuel flow, the controller 60 subsequently delays (block 110) for a predetermined time interval (one to five minutes, for example) before returning to block 102. The return to block 102 is needed to accommodate potentially changing operating conditions due to the aging of stack 20, variations in the power that is demanded by the load 51, etc.

It is noted that other control loops may be used in combination with the routine 100. For example, the controller 60 may adjust the fuel flow in response to a monitored output power of the fuel cell stack 20. However, the controller 60 still maintains the control provided by the routine 100 to improve the efficiency of the fuel cell stack 20 with respect to the fuel flow.

In some embodiments of the invention, circuitry other than the controller 60 may be used to perform one or more parts of the routine 100. For example, in some embodiments of the invention, the cell voltage monitoring circuit 40 may determine whether the efficiency can be improved and indicate to the controller 60 whether to increase or decrease the fuel flow based on this determination. For purposes of simplifying the description below, it is assumed that the controller 60 determines whether the efficiency can be improved, although other variations are possible.

Figure 4:
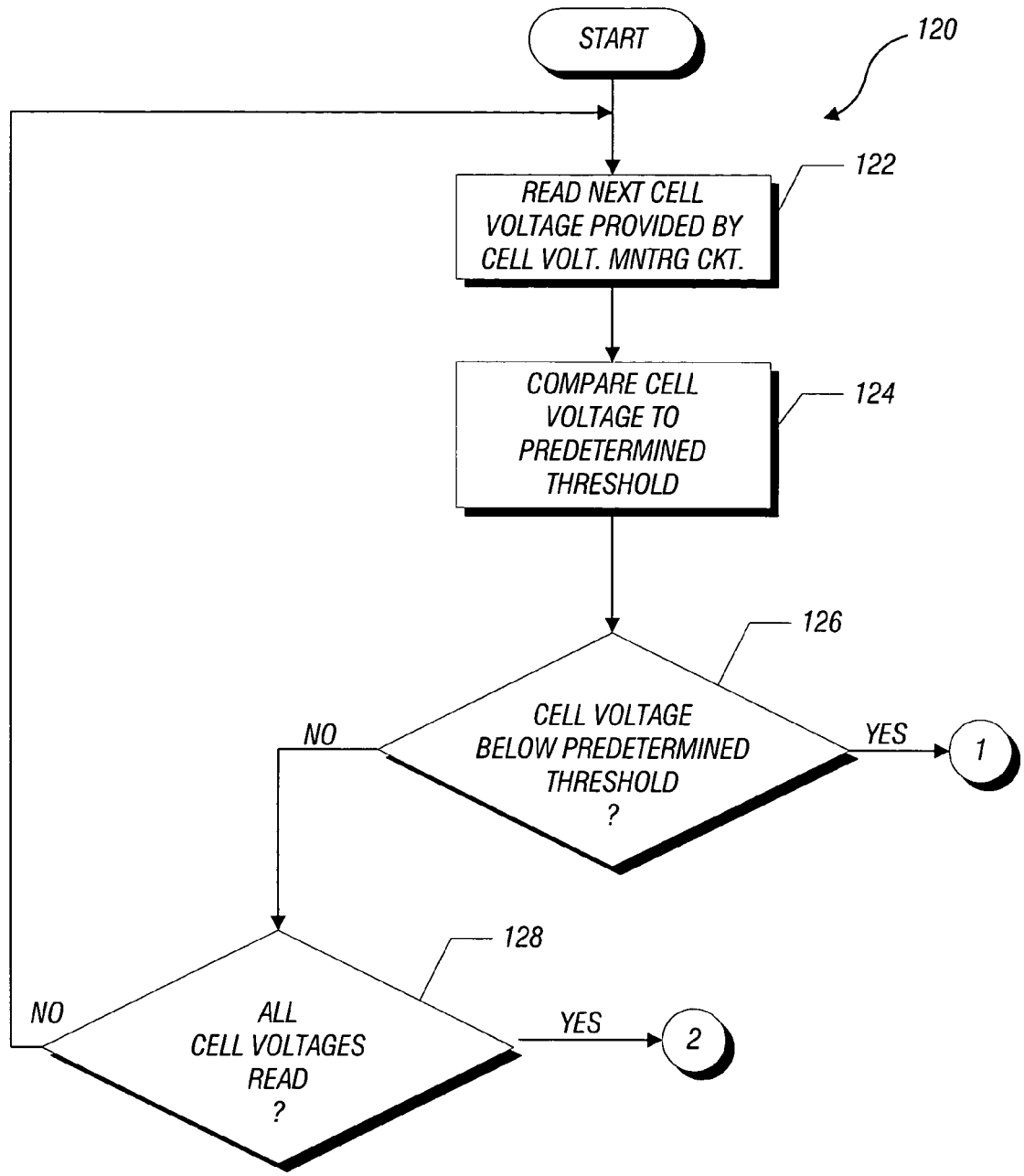

There are numerous ways for the controller 60 to determine whether the efficiency can be improved. For example, FIG. 4 depicts a routine 120 that the controller 60 may perform (when executing the program 65) to make this determination. In the routine 120, the controller 60 retrieves an indication of, or reads, the cells voltages one at a time to determine if one of the cell voltages indicates that the corresponding cell is being deprived of sufficient fuel. In this manner, the controller 60 reads (block 122) the next cell voltage that is provided by the cell voltage monitoring circuit and compares (block 124) the cell voltage to a predetermined threshold (a voltage between −0.5 and 0.5 volts, as an example). When a cell of the fuel cell stack 20 is starved of fuel, the voltage of the cell significantly drops, and the detection of this drop is provided by the comparison of the cell voltage to the predetermined threshold. Thus, if the controller 60 determines (diamond 126) that the cell voltage is below the predetermined threshold, control returns to block 108 (see FIG. 3) of the routine 100. Otherwise, the controller 60 determines (diamond 128) if all cell voltages have been read. If not, the controller 60 reads (block 122) the next cell voltage. If all cell voltages have been read, control returns to block 102 (see FIG. 3) of the routine 100.

In some embodiments, a fuel flow limit may be set on the fuel flow that could be used to sustain the cells within the acceptable voltage range. For example, when a cell voltage remains under the predetermined voltage threshold after the fuel flow has been increased to such a limit, the fuel cell system may be programmed to shut itself off or activate a low efficiency signal or alarm, as examples. In other embodiments, when the fuel flow limit is reached, the system can reset the fuel flow and then similarly increase the oxidant flow to see if the low cell voltage can be brought above the desired threshold. The fuel and oxidant flows can also be manipulated at the same time. Other embodiments are also possible.

Figure 5:
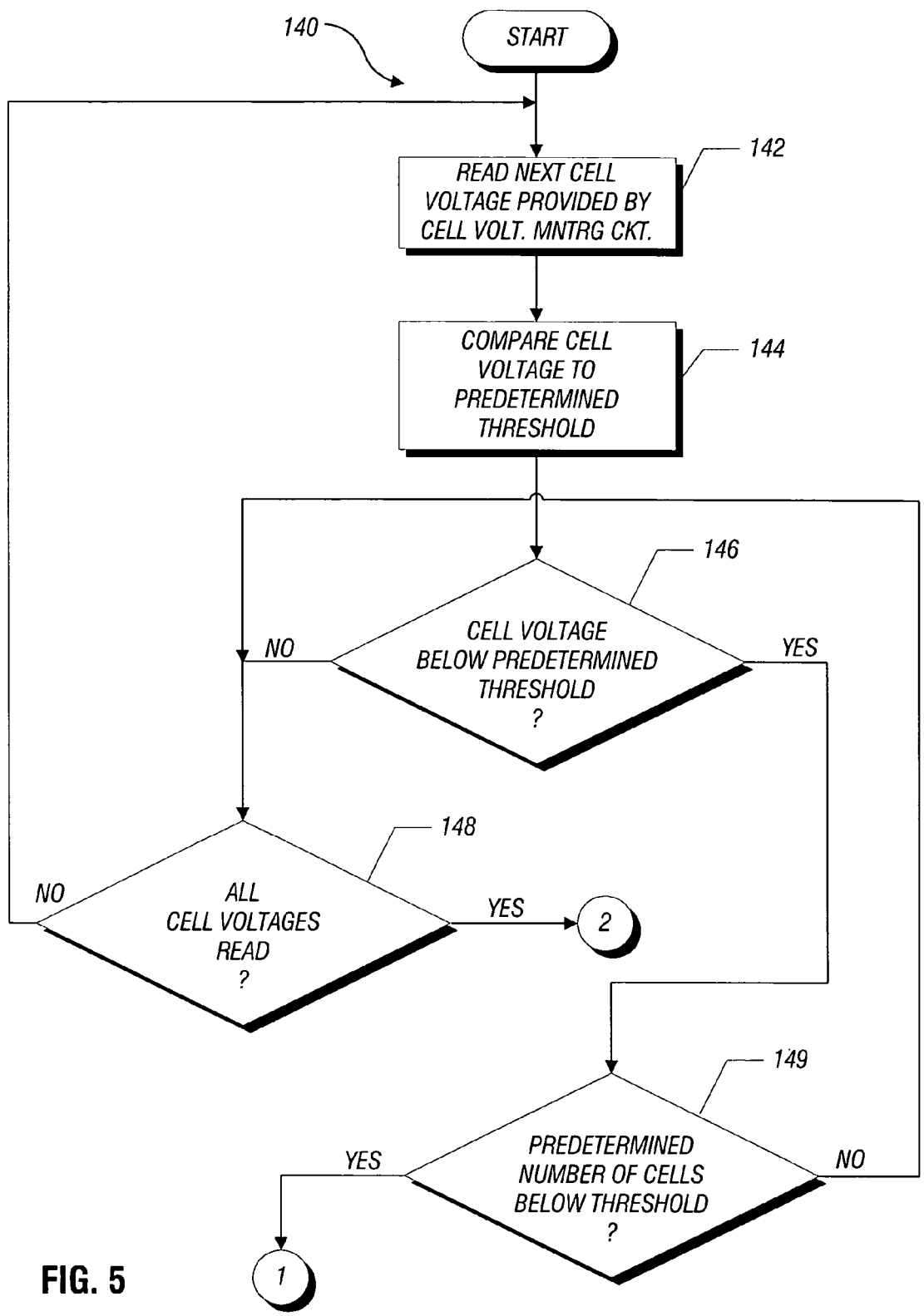

FIG. 5 depicts an alternative routine 140 that the controller 60 may use to determine (diamond 106 of FIG. 3) if the efficiency of the fuel cell stack 20 with respect to the fuel flow can be improved. In the routine 140, the controller 60 reads the cell voltages one at a time to determine if one of the cell voltages indicates that the corresponding cell is being deprived of sufficient fuel. However, unlike the routine 100, in the routine 140, the controller 60 permits a certain number of the cell voltages to fall below the predetermined voltage threshold.

In this manner, in the routine 140, the controller 60 reads (block 142) the next cell voltage that is provided by the cell voltage monitoring circuit 40 and compares (block 144) the cell voltage to the predetermined cell voltage threshold. If the controller 60 determines (diamond 146) that the cell voltage is below the predetermined threshold, then the controller 60 determines (diamond 149) whether a predetermined number (a number between two to ten, as example) of cell voltages have decreased below the threshold. If so, control returns to block 108 (see FIG. 3) of the routine 100. Otherwise, control transfers to diamond 148, the same point where control is transferred if the controller 60 determines (diamond 146) that the cell voltage is not below the cell voltage threshold. In diamond 148, the controller 60 determines if all cell voltages have been read. If so, control transfers to block 102 of the routine 100. Otherwise, control returns to block 142 where the controller 60 reads the next cell voltage.

Figure 6:
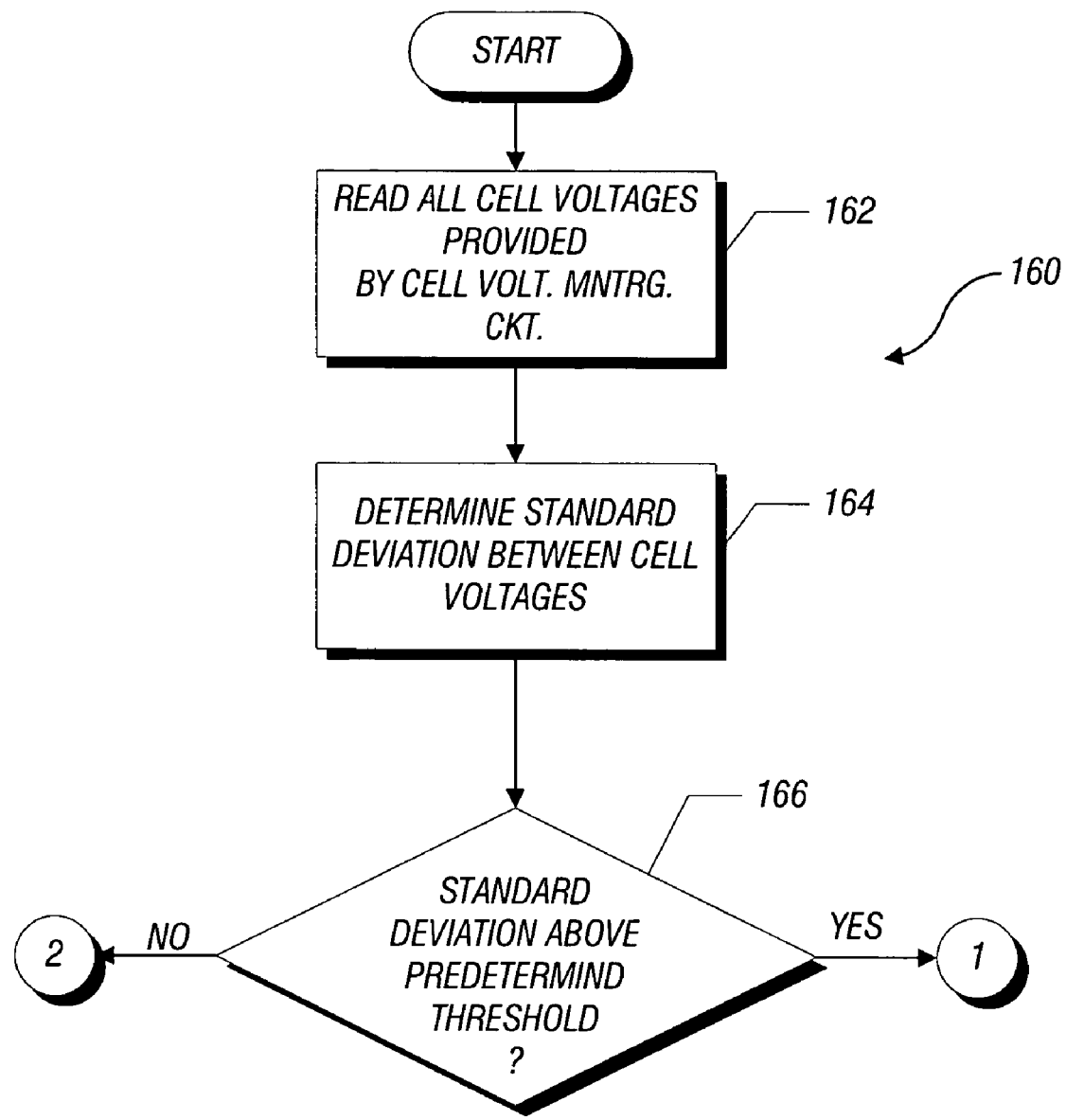
Figure 7:
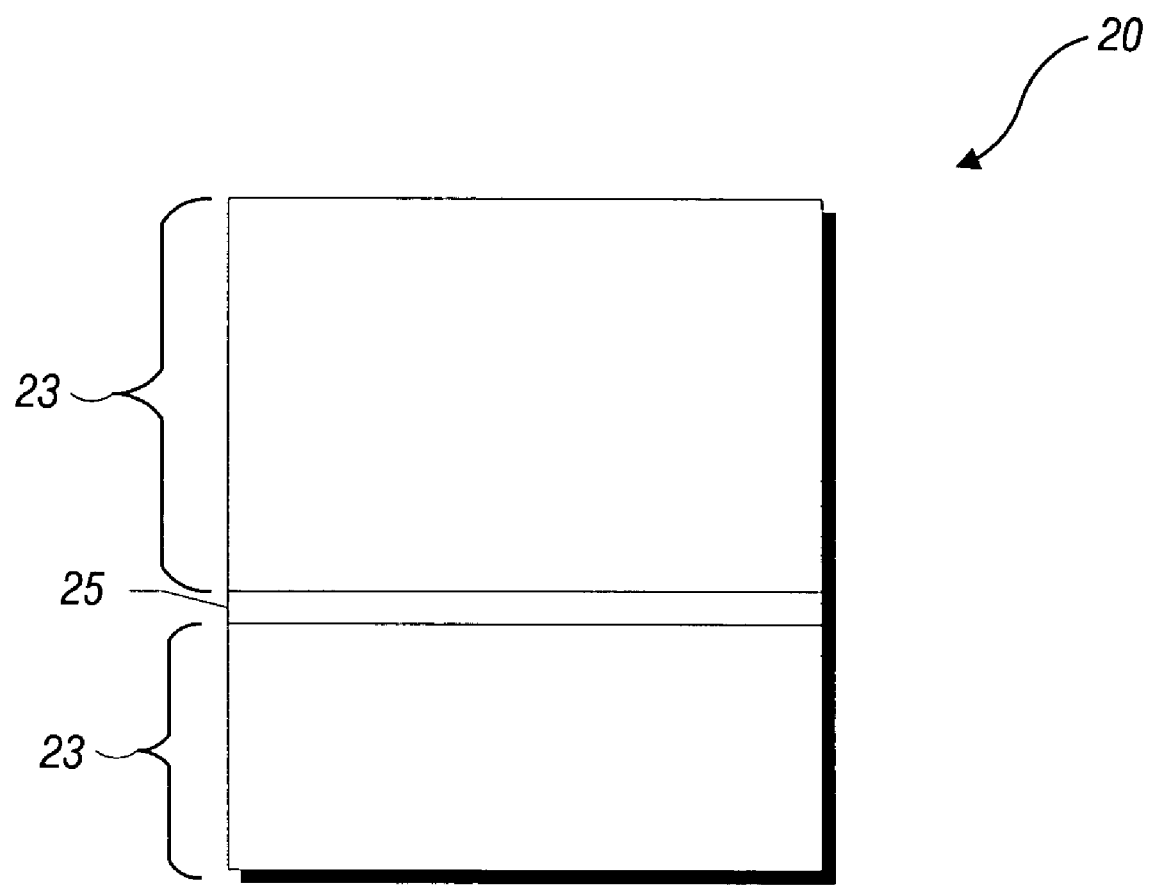
FIG. 7 is an illustration of cells of the fuel cell stack according to an embodiment of the invention.

FIG. 6 depicts another routine 160 that the controller 60 may use to determine (diamond 106 of FIG. 3) of the routine 100) if the efficiency of the fuel cell stack 20 can be improved. In the routine 160, the controller 60 reads (block 162) all of the cell voltages that are provided by the cell voltage monitoring circuit 40. Next, the controller 60 determines (block 164) a standard deviation between the cell voltages. If the controller 60 determines (diamond 166) that the standard deviation is above a predetermined standard deviation threshold, then control transfers to block 108 of the routine 100. Otherwise, control transfers to block 102 of the routine 100. In other embodiments, other indications may be used in lieu of standard deviation. For example, as fuel stoichiometry is reduced, some "weak" cells within a stack will typically exhibit fuel starvation symptoms (e.g., voltage drop) more quickly than the rest of the cells in the stack. As the fuel stoichiometry is reduced, the voltage drop exhibited by such cells may increase exponentially, or at least at a greater rate than other cells in the stack. Thus, the relative voltage drop of a particular cell with respect to a given fuel reduction may also provide a measure according to which control may be transferred between blocks 102 and 108 of the routine 100 (by comparing to such a measure for the other cells, or to a predetermined threshold, as examples). In some embodiments of the invention, the efficiency may be controlled based on a subset of the cells of the fuel cell stack 20. In this manner, referring to FIG. 7, the fuel cell stack 20 may include cells 25 that are not monitored for purposes of regulating the efficiency and a subset 25 of one or more cells that are monitored to regulate the efficiency.

The one or more cells of the subset 25 may be, in some embodiments of the invention, specially constructed so that their voltages decrease below the predetermined cell voltage threshold before the other cells 23. For example, the flow plates that are associated with the subset 25 may have fuel flow channels that are more narrow in cross section than the channels for the other cells 23, and/or the flow plates that are associated with the subset 25 may have fewer fuel flow channels than the flow plates that are associated with the other cells 23. These modifications decrease the flow of fuel into the subset 25, as compared to the other cells. Therefore, the voltages of the one or more cells of the subset 25 may be more sensitive to a decrease in fuel than the voltages of the other cells 23.

Figure 8:
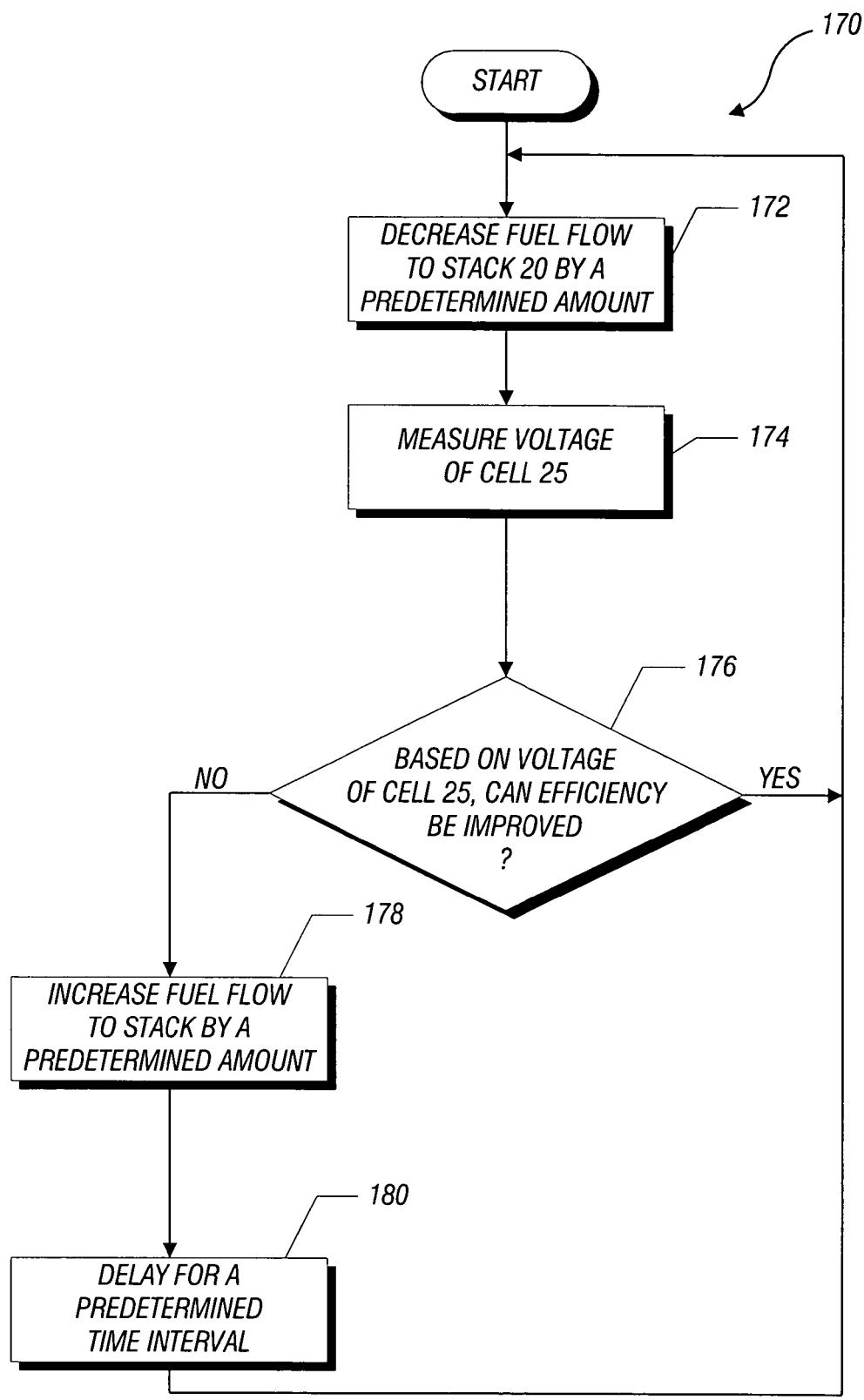

Thus, any of the techniques described above may be used with the cell(s) of the subset 25. For example, FIG. 8 depicts a routine 170 that may be used in place of the routine 100 in the case where the subset 25 includes a single cell. In the routine 170, the controller 60 decreases the fuel flow to the stack 20 by a predetermined amount, as depicted in block 172. Next, the controller 60 obtains (block 174) an indication of the voltage of the cell 25. Subsequently, the controller 60 determines (diamond 176) from the cell voltage whether the efficiency of the stack with respect to the fuel flow can be improved. The controller 60 may accomplish this using one of the techniques that are described above.

If the cell voltage indicates that, after the decrease in fuel flow, the fuel stack 20 is receiving a sufficient amount of fuel, control returns to block 172 to decrease the flow again. Otherwise, the controller 60 has pinpointed the correct fuel flow for efficiency and increases (block 178) the fuel flow by a predetermined amount to return the rate of fuel flow back to the level that existed before the last decrease. The controller 60 subsequently delays (block 180) for a predetermined time interval before control returns to block 172.

Referring back to FIG. 1, among the other features of the fuel cell system 20, the system 20 may include a voltage regulator 30 that regulates a $V_{TERM}$ stack voltage (a DC voltage that is provided by a main output terminal 31 of the fuel cell stack 20) and converts this voltage into an AC voltage via an inverter 33. The output terminals 32 of the inverter 33 are coupled to the load 51. The fuel cell system 10 also includes control valves 44 that provide emergency shutoff of the oxidant and fuel flows to the fuel cell stack 20. The control valves 44 are coupled between inlet fuel 37 and oxidant 39 lines and the fuel and oxidant manifold inlets, respectively, to the fuel cell stack 20. The inlet fuel line 37 receives the fuel flow from the fuel processor 22, and the inlet oxidant line 39 receives the oxidant flow from the air blower 24.

The fuel cell system 20 may include water separators, such as water separators 34 and 36, to recover water from the outlet fuel and oxidant ports of the stack 22. The water that is collected by the water separators 34 and 36 may be routed to a water tank (not shown) of a coolant subsystem 54 of the fuel cell system 10. The coolant subsystem 54 circulates a coolant (de-ionized water, for example) through the fuel cell stack 20 to regulate the operating temperature of the stack 20. The fuel cell system 10 may also include an oxidizer 38 to burn any fuel from the stack 22 that is not consumed in the fuel cell reactions.

To monitor the power output of the fuel cell stack 20, the fuel cell system 10 may include a current sensing element 49 that is coupled in series between the main output terminal 31 of the stack 20 and the input terminal of the voltage regulator 30. An electrical communication line 52 provides an indication of the sensed current to the controller 60. In this manner, the controller 60 may use the indications of cell voltages and the stack voltage from the cell voltage monitoring circuit 40 as well as the indication of the output current provided by the current sensing element 49 to determine the output power of the fuel cell stack 20.

For purposes of isolating the load from the fuel cell stack 20 during a shut down of the fuel cell system 10, the system 10 may include a switch 29 (a relay circuit, for example) that is coupled between the main output terminal 31 of the stack 20 and an input terminal of the current sensing element 49. The controller 60 may control the switch 29 via an electrical communication line 50.

In some embodiments of the invention, the controller 60 may include a microcontroller and/or a microprocessor to perform one or more of the routines described above when executing the program 65. For example, the controller 60 may include a microcontroller that includes a read only memory (ROM) that serves as the memory 63 and a storage medium to store instructions for the program 65. Other types of storage mediums may be used to store instructions of the program 65. Various analog and digital external pins of the microcontroller may be used to establish communication over the electrical communication lines 46, 50 and 52 and the serial bus 48. In other embodiments of the invention, a memory that is fabricated on a separate die from the microcontroller may be used as the memory 63 and store instructions for the program 65. Other variations are possible.

Figure 9:
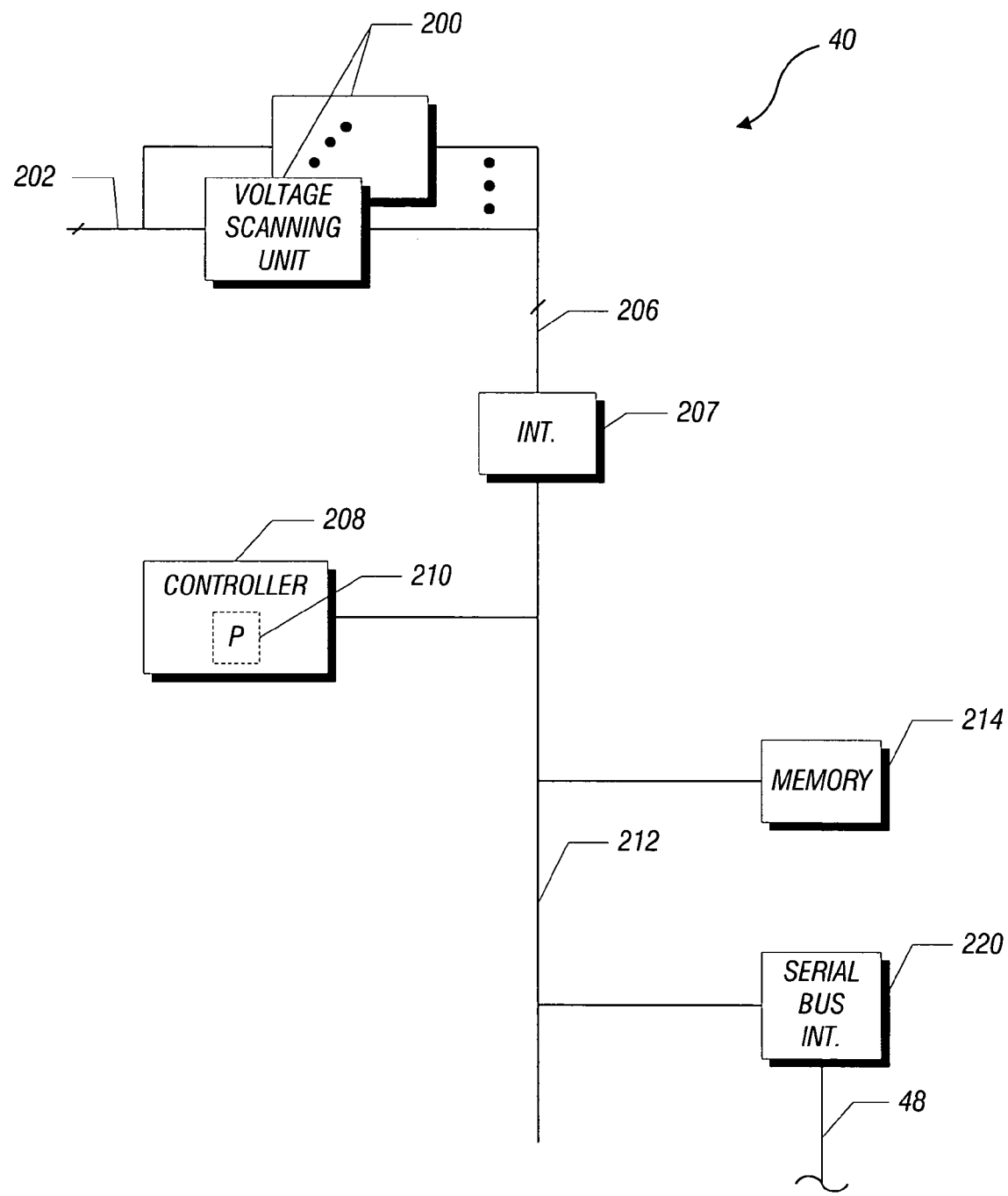
FIG. 9 is a schematic diagram of a cell voltage monitoring circuit of the system of FIG. 1 according to an embodiment of the invention.

FIG. 9 depicts the cell voltage monitoring circuit 40 according to an embodiment of the invention. The cell voltage monitoring circuit 40 includes voltage scanning units 200, each of which is associated with and measures the voltages of a different group of the cells. In this manner, electrical communication lines 202 may connect the voltage scanning units 200 to the various terminals of the fuel cell stack 20. The ground of each voltage scanning unit 200 may be referenced to a terminal of the associated group of cells, as described in U.S. Pat. No. 6,140,820, entitled, "MEASURING CELL VOLTAGES OF A FUEL CELL STACK," granted on Oct. 31, 2000.

In some embodiments of the invention, the cell voltage monitoring circuit 40 may include communication lines 206 that communicate indications of the measured cell voltages from the cell voltage monitoring units 200 to an interface 207. The interface 207 may be coupled to a bus 212 that, in turn, may be coupled to a memory 214 that stores data that indicates the measured voltages. A controller 208 of the cell voltage monitoring circuit 40 may execute a program 210 to cause the controller 208 to periodically cause the cell voltage monitoring units 200 to measure the cell voltages, cause the memory 214 to store the data that indicates the measured voltages, and cause a serial bus interface 220 to communicate indications of the measured voltages to the controller 60 via the serial bus 48.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system comprising:
a fuel cell stack;
a fuel processor to provide a fuel flow to the stack; and
a first circuit coupled to the fuel processor and the stack to:
control the fuel processor to change a rate of the fuel flow,
observe a response of at least one cell voltage of the stack to the changing of the rate, and
control the fuel processor to regulate an efficiency of the stack based on the observation.

2. The system of claim 1, wherein the first circuit controls the fuel processor to change the rate by decreasing the fuel flow by a predetermined amount.

3. The system of claim 1, further comprising:
a second circuit to measure said at least one cell voltage, wherein
the fuel cell stack comprises at least one cell associated with said at least one cell voltage, said at least one cell designed be more sensitive to the change in the rate than cells of the stack other than said at least one cell, and
the first circuit is coupled to the second circuit to receive an indication of said at least one cell voltage.

4. The system of claim 1, further comprising:
a second circuit to measure said at least one cell voltage.

5. The system of claim 4, wherein the first circuit determines if one of the said at least one cell voltage is below a predetermined cell voltage threshold.

6. The system of claim 5, wherein the first circuit controls the fuel processor to increase the rate if the one cell voltage is below the predetermined cell voltage threshold.

7. The system of claim 5, wherein the first circuit controls the fuel processor to keep decreasing the rate until the one cell voltage is below the predetermined cell voltage threshold.

8. The system of claim 1, further comprising:
a second circuit coupled to the stack to provide an indication of said at least one cell voltage to the first circuit, wherein
the first circuit uses the indication to determine if a predetermined number of said at least one cell voltage is below a predetermined cell voltage threshold.

9. The system of claim 8, wherein the first circuit controls the fuel processor to increase the rate if the predetermined number of said at least one cell voltage is below the predetermined cell voltage threshold.

10. The system of claim 8, wherein the first circuit controls the fuel processor to keep decreasing the rate until the one cell voltage is below the predetermined cell voltage threshold.

11. The system of claim 1, further comprising:
a second circuit coupled to the stack and the first circuit to measure said at least one cell voltage, wherein
the first circuit determines a standard deviation of said at least one cell voltage.

12. The system of claim 11, wherein the first circuit controls the fuel processor to increase the rate if the standard deviation is above a predetermined threshold.

13. The system of claim 8, wherein the first circuit controls the fuel processor to keep decreasing the rate until the standard deviation is above a predetermined threshold.

14. A system comprising:
a fuel cell stack;
a fuel processor to provide a fuel flow to the stack; and
a circuit coupled to the fuel processor to:
select a group of one or more fuel cells of a fuel cell stack;
monitor one or more cell voltages of the group;
determine from said one or more cell voltages whether the fuel cell stack is failing to consume substantially all of a fuel flow that is being provided to the stack; and
adjust the fuel flow until said one or more cell voltages indicate that the fuel cell stack is consuming substantially all of the fuel flow that is being provided to the stack.

15. The system of claim 14, wherein the circuit causes the fuel processor to decrease fuel flow to the stack until said one or more cell voltages indicate that the fuel cell stack is consuming substantially all of the fuel flow that is being provided to the stack.

16. The system of claim 14, wherein the circuit causes the fuel processor to decrease the fuel flow that is being provided to the stack until said one or more cell voltages indicate that the fuel cell stack is being deprived of fuel.

17. The system of claim 16, wherein the circuit causes the fuel processor to increase the fuel flow that is being provided to the fuel cell stack until said one or more cell voltages indicate that the fuel cell stack is consuming substantially all of the fuel flow.

18. The system of claim 14, wherein the circuit determines if at least one voltage of said one or more cell voltages decreases below a predetermined cell voltage threshold.

19. The system of claim 14, wherein the circuit determines if at least a predetermined number of said one or more cell voltages decrease below a predetermined cell voltage threshold.

20. The system of claim 14, wherein the circuit determines a standard deviation among said one or more cell voltages.

21. The system of claim 14, wherein the circuit causes the fuel processor to adjust the fuel flow by predetermined increments.

22. The method of claim 14, wherein the circuit causes the fuel processor to interact with a cell voltage monitoring circuit to monitor said one or more said voltages.

23. A system comprising:
a fuel cell stack;
a fuel processor to provide a fuel flow to the stack; and
a circuit coupled to the fuel processor and the stack to:
monitor a group of one or more cell voltages of the fuel cell stack is to determine whether one or more of the cell voltages of the group are substantially equal to a cell threshold voltage indicative of a cell being starved of fuel; and
in response to the monitoring, adjust a fuel flow to the fuel cell stack until at least one of said one or more cell voltages is substantially equal to the cell threshold voltage.

24. The system of claim 23, wherein the circuit causes the fuel processor to decrease the fuel flow until at least one of said one or more cell voltages is less than the cell threshold voltage.

25. The system of claim 23, wherein the circuit causes the fuel processor to decrease the fuel flow until at least one of said one or more cell voltages is substantially equal to the cell threshold voltage.

26. The system of claim 23, wherein the circuit causes the fuel processor to increase a fuel flow to the fuel cell stack in response to at least one of said one or more cell voltages being below the cell threshold voltage.

27. The system of claim 23, wherein the cell threshold voltage is indicative of an abrupt cell voltage decrease due to the fuel flow being insufficient.

28. The system of claim 23, wherein the cell threshold voltage comprises a voltage in the range of −0.5 voltage to 0.5 volts.

* * * * *